United States Patent [19]

Lesk

[11] 3,979,107

[45] Sept. 7, 1976

[54] METHOD OF AND APPARATUS FOR THE ADMIXING OF A PIGMENT COLOR IN A DOSAGED MANNER INTO A PLASTICS MATERIAL GRANULATE

[75] Inventor: Adolf Lesk, Osterburken, Germany

[73] Assignee: AZO-Maschinenfabrik Adolf Zimmermann, Osterburken, Germany

[22] Filed: Oct. 10, 1973

[21] Appl. No.: 404,905

[30] Foreign Application Priority Data
Oct. 14, 1972 Germany............................. 2250561

[52] U.S. Cl................................. 259/10; 259/68; 259/191; 259/192; 260/37 R; 260/42; 264/349
[51] Int. Cl.² .......................................... B01F 7/02
[58] Field of Search .................. 260/42; 259/191, 6, 259/9, 10, 68, 185, 192

[56] References Cited
UNITED STATES PATENTS
3,148,412 9/1964 Spreeuwers.......................... 264/211

Primary Examiner—James H. Derrington
Attorney, Agent, or Firm—Craig & Antonelli

[57] ABSTRACT

A coarse-particle plastics granulate is colored by being dosed and mixed with a fine-powder pigment by means of a dosaging screw and, if necessary, an after-mixer at the discharge end of said screw. A coarse-particle "cleaning material" is supplied to the dosaging screw upstream of the pigment to prevent sticking and caking of the fine powder and to achieve uniform distribution of the color in the granulate. A proportion of the granulate itself may be introduced as the cleaning material. The dosaging screw is mounted so as to be readily replaceable by a clean one. It may be formed with two sections of different diameter so that the entry volume at the cleaning material inlet is smaller than at the pigment inlet. The dosaging screw is normally driven in time with a plastics processing machine using the colored granulate, but may be adapted to operate discontinuously when only a small amount of color is required or when the machine output is small.

24 Claims, 5 Drawing Figures

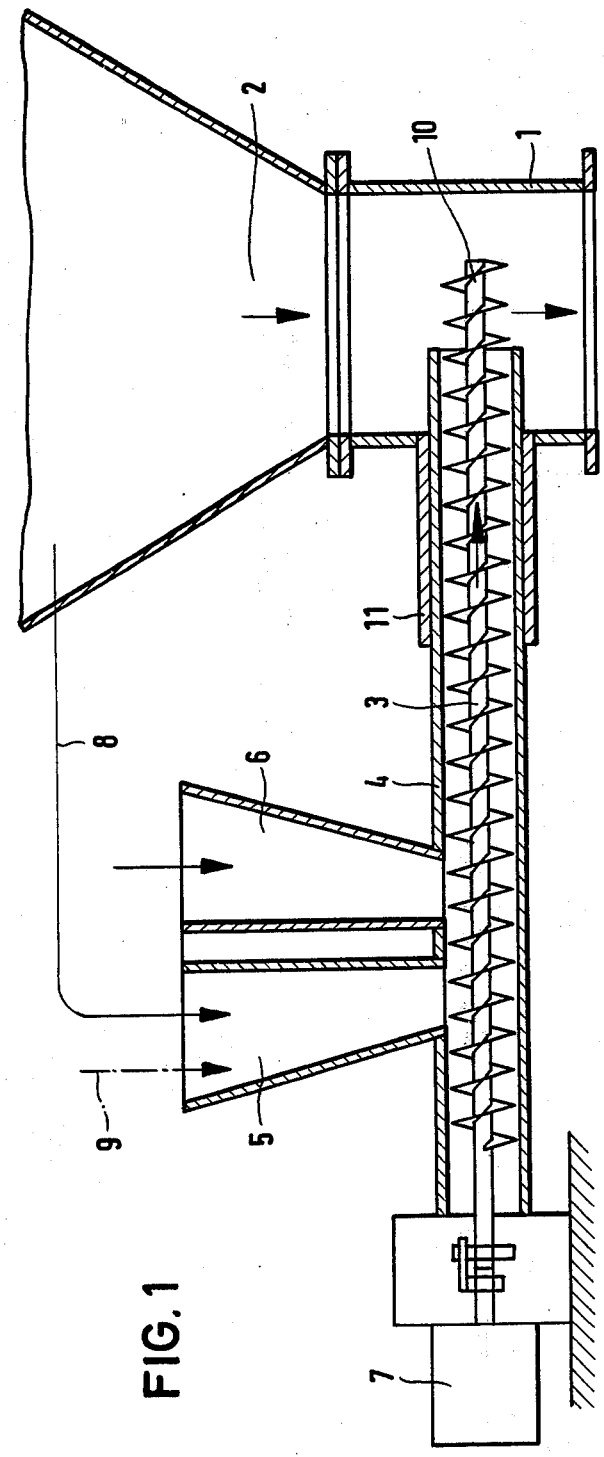
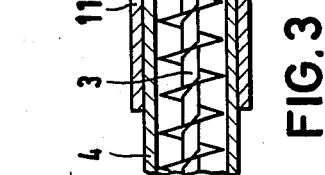
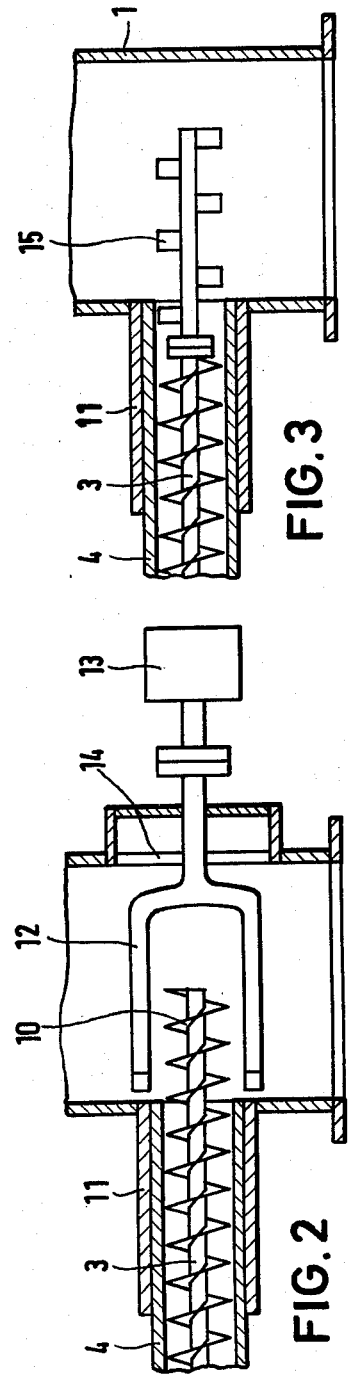
FIG. 1
FIG. 3
FIG. 2

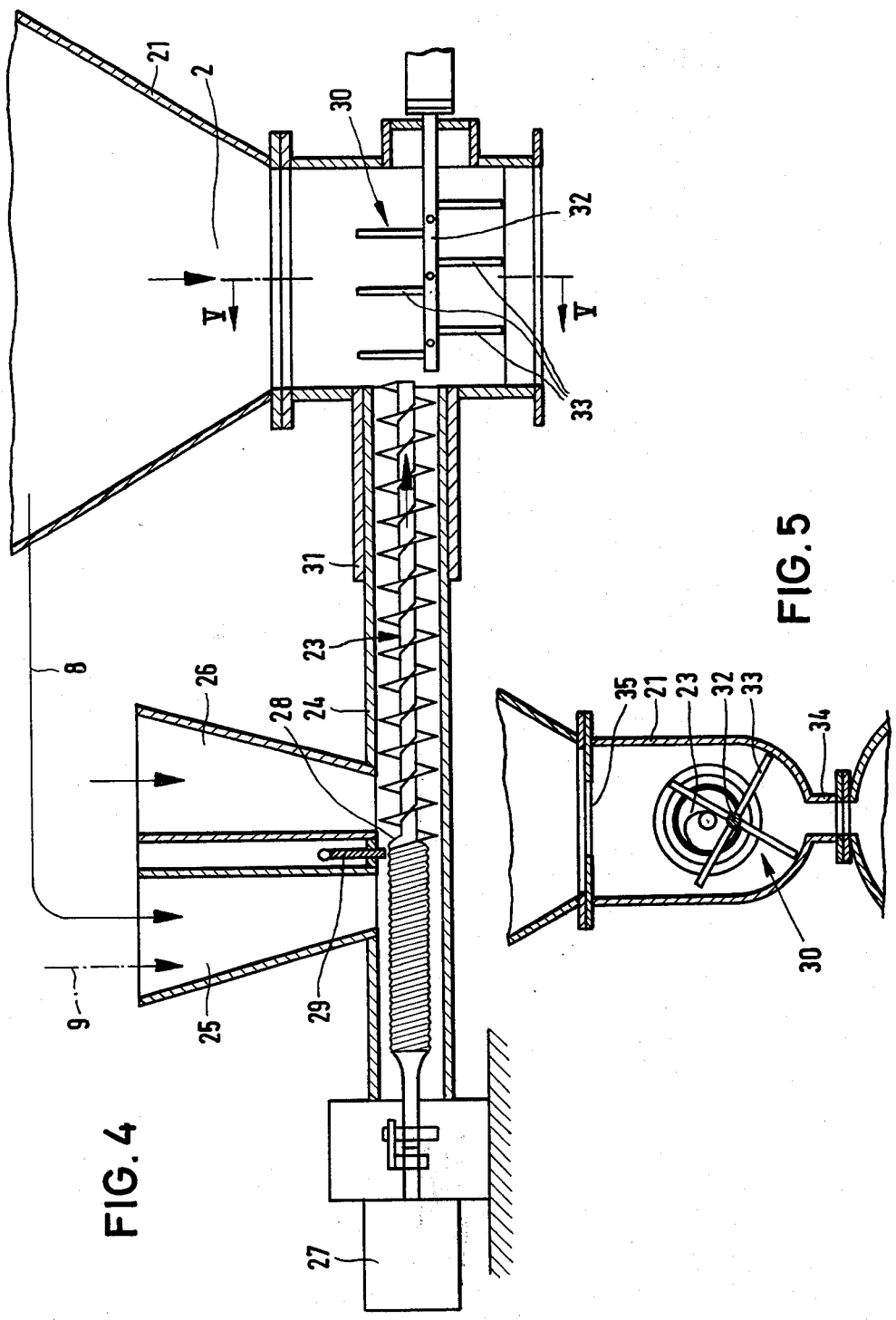

METHOD OF AND APPARATUS FOR THE ADMIXING OF A PIGMENT COLOR IN A DOSAGED MANNER INTO A PLASTICS MATERIAL GRANULATE

The invention relates to a method of admixing a pigment color or coloring substance in the form of a fine powder in a dosaged manner into a plastics material granulate which is of course particle size relative to the pigment color and which is to be processed by a plastics material processing machine, for example an extruder or injection moulding machine of screw type, by means of a dosaging screw, and also an apparatus for carrying out this method.

In the injection moulding of plastics materials, more particularly using screw extruders, the production of plastics material articles with a satisfactory and reproducible coloring presents difficulties. To color the plastics material granulate, very small quantities of coloring substance are sufficient, but these have to be distributed uniformly in a relatively large quantity of granulate. In addition, certain granulates build up a static charge during transport, so that arrangements have to be made to ensure that the colour is taken up in a uniform manner on the individual granulate particles. In addition, this very small quantity of color must be capable of being adjusted in an infinitely variable manner in order to obtain plastics material articles of slight to very intense coloring with the same color shade.

It is true that for example screw extruders themselves have a certain mixing action, but this alone cannot achieve uniform colouring all through. Therefore, it is usual for surface-colored granulate, produced in a separate apparatus, to be introduced batchwise into the feed hopper of the screw extruder, this hopper containing the raw granulate. But this arrangement does not make it possible to achieve a continuous and more or less precise and therefore reproducible operation. It is also known to obtain the entire quantity of granulate to be processed from the granulate manufacturer already in a coloured state. But this method makes the processing firm very dependent on the manufacturer, not only as regards the production process but also as regards the colouring of the product. In another and relatively more advantageous method, individual granulate particles in themselves are intensively colored or dyed and added directly to the raw granulate at the processing machine. But this again requires separate production of the colored granulate. Finally, droplet dosaging of colour paste is known, but this method does not operate in a satisfactory manner, since the droplet dosaging is not very precise and also does not permit satisfactory distribution of the color.

All the known methods, wherein the addition of colouring substance is effected directly at the machine, as is per se desirable, have the disadvantage that pockets of color are formed within the raw granulate, that is to say accumulations with a large concentration of color, which can only be dissolved sufficiently if they are precisely adapted to the output and to the mixing effect of that particular processing machine, which is hardly ever satisfactory, and more particularly this is true when admixing pigment colors by means of a dosaging screw, since in this case there is also the caking-together and sticking of the color.

An object of the invention is to provide an improved method and an apparatus for carrying out the method, by means of which it is possible to admix the color in a satisfactory dosaged manner into a plastics material granulate by means of a dosaging screw, aiming at distributing the colour in a uniform manner within the granulate already before the material is introduced into the processing machine, the mixing effect of which can thus be disregarded.

Assuming a method operating with a dosaging screw, this object is achieved according to one aspect of the invention in that the dosaging screw is fed upstream of the addition of colour in the direction of conveyance with a coarse particle cleaning material and that the material thus pre-mixed is subjected with the plastics material granulate to an after-mixing operation. By the expression cleaning material in this case there is understood a material which is of a subtantially coarser particle size than the color.

Whereas hitherto the dosaging of a pigment colour by means of an extremely slow-running dosaging worm involved difficulties since the color in fine powder form sticks to the walls and between the screw threads in a very short time so that delivery is not uniform and finally stops completely, the cleaning material proposed by the invention obviates such difficulties. This coarse-particle material fed into the dosaging screw before the color is fed in ensures that the screw threads are always kept free and the color is continually circulated. In addition, the cleaning material has a certain grinding effect, which is advantageous more particularly in the case of a pigment color which has been made capable of flowing by agglomeration or the like, that is to say no longer consists of particles of a few hundredths of a millimeter but of a few tenths of a millimeter in diameter. In this way it is possible to dosage the color in a satisfactory, precise and repeatable manner. The after-mixing distributes the colour in a uniform manner in the plastics material granulate. The color concentration itself can be adjusted in known manner by regulating the rotational speed of the dosaging screw.

Preferably a small part-quantity of the plastics material granulate which is to be processed is used as the cleaning material. Instead of this, it is also possible to use another coarse-particle material, for example so-called regenerated plastics material, that is to say plastics material which has already been processed and has been put aside as waste or scrap, has been comminuted to obtain a granulate, and introduced again into the processing machine.

To carry out the method there is provided, according to another aspect of the invention, apparatus which comprises a slow-running dosaging screw which can have its rotational speed regulated and which opens into the feed hopper of the processing machine, the apparatus having a first inlet for the cleaning material, an inlet for the color which is arranged downstream of the first inlet in the direction of conveyance, and an after-mixer which is arranged downstream of the dosaging screw.

If the cleaning material used as a part-quantity of the plastics material granulate which is to be processed, this can either be introduced separately into the first inlet or diverted from the feed hopper, which contains the total quantity of plastics material granulate to be processed. The cleaning material introduced at the first inlet is mixed with the subsequently introduced color and keeps the spaces between the screw threads clear of caked-on deposits, so that as the screw rotates a precise quantity, which can be repeated with a given rotational speed or a given number of revolutions, of pre-mixed and colored material is always discharged into the feed hopper of the machine and is thoroughly mixed there with the raw granulate by the after-mixer.

According to a preferred constructional form of the apparatus, the entry volume of the dosaging screw at the cleaning material inlet is smaller than at the color inlet. This ensures that in spite of the filling of the dosaging screw with the cleaning material a sufficient amount of color is always drawn in.

It has also been found advantageous to arrange an annular gap between the dosaging screw and the tube which surrounds it, and to arrange a baffle plate partly closing this annular gap between the cleaning material inlet and the color inlet. This prevents the cleaning material from being pressed back into the color inlet, which would block the introduction of color.

Preferably the dosaging screw is arranged to be interchangeable on the feed hopper, so that when there is a colour change it can be replaced in a simple manner by another clean screw, so as to minimize "standstill time. The point is that cleaning a screw takes a very long time.

In principle, known constructions can be used for the after-mixer arranged after the dosaging screw in the feed hopper of the machine. However, according to a feature of the invention, the after-mixer, independently of its constructional arrangement, has several times the volume of the outlet volume of the processing machine. Consequently, the pre-mixed material issuing from the dosaging screw has a longer time of dwell within the raw granulate and is thoroughly mixed before the final product is taken from the machine. By suitable dimensioning of the mixer volume it is possible to ensure that even with very large injection moulded articles, that is to say with the maximum delivery volume of the machine, the pre-mixed material does not arrive directly into the machine.

This purpose is also served by the further feature that the feed hopper between the after-mixer and the processing machine is narrowed to a cross-section suitable for the delivery volume thereof. In order to have a sufficient free volume for the mixing operation within the after-mixer, the after-mixer has a narrowed inlet, which ensures that there are always dead spaces in the after-mixer.

Since the quantity of colour can vary in the ratio 1:100 and this range cannot be covered entirely by rotational speed regulations of the dosaging screw, the driving motor can have associated therewith a transmission gear or a time relay circuit or a stepping mechanism, so that the dosaging screw operates stepwise, for example with extremely small quantities of color.

Preferably the dosaging screw is driven in a timed manner, for example by means of a pulse generator, in accordance with the working travel or stroke of the processing machine, so that the screw rotates through a specific angle of rotation at each working travel, this angle determining the quantity of pre-mixed material added. With very small mouldings or very small quantities of color, in some cases there will only be a fraction of one complete revolution. In this case the dosaging no longer operates with sufficient precision, since the driving motor alone has a certain starting delay. According to a feature of the invention, it is proposed under these circumstances that the drive of the dosaging screw is brought into operation only after two or more working travels of the processing machine, but with a correspondingly slower working cycle. If a specific small angle of rotation of the dosaging screw corresponds for example to the color or pre-mixing quantity to be dosaged, the dosaging screw is set in motion, for example, only after five working travels of the machine, but then it rotates by five times the angle of rotation, this again corresponding to a precisely repeatable dosaging quantity. The above-described after-mixer keeps sufficient mixed material ready for the machine.

Of course, without using the advantages provided by the invention, it is possible with the apparatus also to process pre-coloured granulate, this being fed in place of the colour into the inlet thereof. Thus the apparatus according to the invention can also process other material for colouring. Furthermore, the invention can be used with all plastics material processing machines, whether or not they operate continuously or discontinuously.

The invention will now be described, by way of example, with reference to the accompanying drawings in which:

FIG. 1 shows a diagrammatic longitudinal section through one form of apparatus embodying the invention;

FIG. 2 shows a diagrammatic partial view of another form of after-mixer which may be substituted for that shown in FIG. 1;

FIG. 3 shows a view similar to FIG. 2 of a further form of after mixer;

FIG. 4 shows a view similar to FIG. 1 of another form of apparatus embodying the invention; and FIG. 5 shows a section of V—V of FIG. 1.

Referring to the drawings, the plastics material processing machine which is constructed in a conventional manner, for example a screw extruder, is not fully illustrated. All that is shown of the said machine is its feed hopper 1 in which the plastics material granulate to be processed accumulates, a certain quantity of the said granulate being removed therefrom at each working travel, so that the granulate stored in the feed hopper 1 slides down in the direction of the arrow 2.

A dosaging screw 3 opens into the feed hopper 1, this screw being surrounded by a cylindrical tube 4. The tube 4 has a first inlet hopper 5 and a second inlet hopper 6 which is arranged downstream of the first inlet hopper in the direction of conveyance. The dosaging screw 4 is driven by a drive 7 which is not shown in more detail and is controlled by the processing machine.

The coarse-particle cleaning material is introduced into the first inlet hopper 5. This material may be material identical with the plastics material granulate in the feed hopper 1 or may be another coarse-particle material. Consequently, the cleaning material can be taken from the hopper 1 by way of a conduit 8 and introduced into the inlet hopper 5, or it can be introduced therein separately as shown by the direction arrow 9.

The pigment colour is introduced in a fine powder form or flowable form into the second inlet hopper 6.

When the dosaging screw rotates through an angle of rotation adapted to the desired colour intensity and machine output, a suitable part-quantity of colour is drawn into the tube 4. Likewise, the cleaning material stored in the inlet hopper 5 slips down between the threads of the dosaging screw 3. After the inlet hopper 6, a pre-mixed material exists comprising plastics material granulate and color with a relatively strong color concentration. The cleaning material ensures that the color is conveyed in a satisfactory manner, and more particularly that there is no caking or sticking-on.

The end 10 of the dosaging screw 3 projects freely into the feed hopper 1 so that no blockages occur at the discharge end of the dosaging screw. The pre-mixed material is distributed uniformly approximately in the region of the central axis of the feed hopper 1. The rotating dosaging screw ensures that an after-mixing effect is obtained within the feed hopper 1.

The dosaging screw 3 is arranged with the tube 4 surrounding it and all the parts arranged thereon in an interchangeable manner on the feed hopper 1. For this purpose, for example, the feed hopper 1 has a tubular extension element 11 into which the dosaging tube 4 supported at one end is fitted. By releasing the support the entire dosaging apparatus can be replaced in a simple manner by a cleaned new dosaging apparatus, for example in order to change the color which is being used.

FIG. 2 shows a constructional form wherein a separate after-mixer is used. It consists for example of finger-like mixing elements 12 which surround the free end 10 of the dosaging screw 3 in an axially parallel manner. A drive 13 rotates the finger-like mixing elements, and they rotate about the free end 10 of the dosaging screw so that the pre-mixed material discharged thereby is strongly circulated and uniformly distributed, directly within the plastics material granulate contained in the feed hopper 1. The finger-like mixing element 10 can be parts of a fork driven at its centre. The after-mixer is also preferably arranged in an interchangeable manner on the feed hopper 1, the latter having at the side opposite from the dosaging screw, an opening 14 for the introducing the after-mixer.

In the constructional form shown in FIG. 3 a blade mixer 15 is connected as an after-mixer directly to the end of the dosaging screw 3. Thus, the mixer does not have any drive of its own but rotates with the rotational speed of the dosaging screw 3 within the plastics material granulate contained in the feed hopper 1.

Whereas the aforesaid constructional forms operate in a satisfactory manner with an approximately constant and relatively large processing machine delivery volume, the constructional form shown in FIG. 4 and FIG. 5 is particularly suitable for the case, which occurs frequently, where the machine delivery varies considerably.

The dosaging screw 23 again rotates in a tube 24 and is driven by a motor 27. The dosaging tube 24 has a cleaning material inlet 25 and a color inlet 26, these being situated one behind the other in the direction of conveyance, and is fitted into an extension element 31 on the feed hopper 21. The dosaging screw provides, in the region of the cleaning material inlet 25, a smaller entry volume than at the color inlet 26, the free cross-section being made suddenly greater there, for example by the sudden diameter change in the screw core indicated at 28. Also it has been found particularly simple and convenient to form the threading, at least in the region of the cleaning material inlet 25, by a single thread.

Between the two inlets 25, 26 there is arranged a baffle plate 29 which displaces the cleaning material into the lower half of the dosaging tube 24. The baffle plate can be constructed as a slide in order to allow the annular gap existing between the dosaging tube 24 and the dosaging screw to be opened completely.

In the constructional form according to FIG. 4 and FIG. 5 the after-mixer 30 is formed of pins 33 arranged on a shaft 32. As FIG. 5 shows more particularly, the mixer volume is considerably larger than the delivery volume of the machine indicated at 34 by the narrowed cross-section, so that the pre-mixed material is made to have a relatively long time of dwell in the after-mixer. In order to obtain a free mixing space, a narrowed inlet 35 for the after-mixer is provided in the feed hopper 21.

The control of the drive 7 or 27 of the dosaging screw 3 or 23 is carried out in a timed manner, in that each working travel of the machine the drive is set in operation for a specific time, for example by means of a timing relay, so that the dosaging screw rotates through a specific angle and delivers a specific quantity. The timing relay is accordingly set to the desired time. With a very small material discharge, that is to say in the case of small plastics articles, it is advisable to adjust the timing relay to produce a relatively large angle of rotation but to actuate the drive only after a suitable number of working travels of the machine.

The kind of after-mixer 30 shown in FIGS. 4 and 5 may also be employed in apparatus with a simple dosaging screw 3 as shown in FIG. 1, 2 or 3 but with the free end 10 preferably positioned close to the after-mixer 30 as in FIGS. 4 and 5. The kind of after-mixer 12 shown in FIG. 2 may also be suitable as a substitute for the after-mixer 30 in apparatus as shown in FIGS. 4 and 5 but with the free end of the dosaging screw preferably extending into the region of the after-mixer 12 as shown in FIG. 2.

I claim:

1. A process for admixing a controlled amount of a colorant in the form of a fine powder with a granulated plastic material being fed via a hopper to a plastics material processing machine, said process comprising feeding a quantity of a cleaning material comprising a coarse-particle plastic material to said hopper by means of a dosaging screw connected to said hopper, feeding to said dosaging screw said colorant so that said colorant and said cleaning material are fed together to said hopper, said colorant being fed to said dosaging screw downstream of the location at which said cleaning material is fed to said dosaging screw, and mixing said colorant and said cleaning material with said granulated plastic material prior to entry of said colorant, said cleaning material and said granulated plastic material into said processing machine.

2. The process according to claim 1 wherein said cleaning material is composed of said granulated plastics material.

3. The process according to claim 2, wherein said granulated plastics material is fed to said hopper, and thereafter a portion of the granulated plastics material in said hopper is fed to said dosaging screw.

4. The process according to claim 1, wherein said cleaning material is regenerated plastics material which has already been processed by said plastics material processing machine and which has been comminuted to obtain a granulate.

5. The process according to claim 1, wherein all of said cleaning material is fed to said dosaging screw upstream of the location where said colorant is fed to said dosaging screw.

6. The process according to claim 1, wherein said dosaging screw is horizontal.

7. The process according to claim 1, wherein the chamber in which said colorant, said cleaning material and said granulated plastics material are mixed has a volume several times the volume of the outlet volume of the plastics processing machine.

8. The process according to claim 3, wherein said cleaning material is fed to said dosaging screw through a first inlet and further wherein said colorant is fed to said dosaging screw through a second inlet downstream of said first inlet.

9. The process according to claim 8, wherein the entry volume of the dosaging screw at said first inlet is smaller than the entry volume of said dosaging screw at said second inlet.

10. The process according to claim 8, further comprising preventing said cleaning material from being pressed back into said second inlet.

11. The process according to claim 10, wherein cleaning material is prevented from entering said second inlet by arranging a baffle plate partly closing the annular gap between said first inlet and said second inlet.

12. The process according to claim 1, wherein said cleaning material is fed to said dosaging screw through a first inlet and further wherein said colorant is fed to said dosaging screw through a second inlet downstream of said first inlet.

13. The process according to claim 12, wherein the entry volume of the dosaging screw at said first inlet is smaller than the entry volume of said dosaging screw at said second inlet.

14. The process of claim 12, further comprising preventing said cleaning material from being pressed back into said second inlet.

15. The process according to claim 14, wherein cleaning material is prevented from entering said second inlet by arranging a baffle plate partly closing the annular gap between said first inlet and said second inlet.

16. The process according to claim 12, wherein the particle size of said granulated plastics material and the particle size of said cleaning material are substantially coarser than the particle size of said colorant.

17. The process according to claim 8, wherein the particle size of said granulated plastics material and the particle size of said cleaning material are substantially coarser than the particle size of said colorant.

18. The process according to claim 1, wherein the particle size of said granulated plastics material and the particle size of said cleaning material are substantially coarser than the particle size of said colorant.

19. A process for admixing a controlled quantity of a powdered colorant with a plastic material granulate to be processed by a plastics material processing machine in such a way that said colorant is distributed uniformly in said plastic material granulate before said granulate is introduced into said processing machine, said process comprising feeding a cleaning material composed of plastic particles having a substantially coarser particle size than said colorant to a chamber for mixing with said plastic material granulate, said cleaning material being fed to said chamber by means of a dosaging screw, feeding said colorant to said dosaging screw downstream of the inlet in said dosaging screw for said cleaning material so that said colorant is fed to said chamber along with said cleaning material, feeding said plastic material granulate to said chamber and mixing the colorant, cleaning material and plastics material granulate fed to said chamber prior to entry of said colorant, cleaning material and plastic material granulate into said processing machine.

20. The process according to claim 19, wherein said cleaning material is composed of a portion of said plastics material granulate.

21. The process according to claim 19, wherein said cleaning material is a regenerated plastic material.

22. The process according to claim 19, in which said colorant is an agglomerated product of satisfactory flowing properties, said agglomerated product being milled in the dosaging screw by means of the cleaning material.

23. The process according to claim 19, wherein the particle size of said granulated plastics material and the particle size of said cleaning material are substantially coarser than the particle size of said colorant.

24. The process according to claim 23, wherein the volume of said chamber is several times the outlet volume of said processing machine.

* * * * *